United States Patent [19]
van Gils

[11] 4,319,152
[45] Mar. 9, 1982

[54] LAMINATED WINDING FOR ELECTRIC MACHINES

[76] Inventor: Adrianus W. van Gils, Jacob Pronkstraat 2A, Den Haag, Netherlands

[21] Appl. No.: 961,865

[22] Filed: Nov. 20, 1978

Related U.S. Application Data

[63] Continuation of Ser. No. 711,556, Aug. 4, 1976, abandoned.

[30] Foreign Application Priority Data

Jul. 12, 1976 [NL] Netherlands .......................... 7607705

[51] Int. Cl.³ ............................................. H02K 3/04
[52] U.S. Cl. .................................. 310/201; 310/207; 310/268; 336/223
[58] Field of Search ............ 310/268, 12, 13, 188–208, 310/216, 217, 264, 265, 42; 336/120, 125, 222, 223, 225, 234, 129; 324/117 R, 127, 158 MG

[56] References Cited

U.S. PATENT DOCUMENTS

| | | | |
|---|---|---|---|
| 459,610 | 9/1891 | Desroziers | 310/268 |
| 526,064 | 9/1894 | Wagemann | 310/268 |
| 1,796,422 | 3/1931 | Apple | 310/201 |
| 2,961,747 | 11/1960 | Lyman | 336/223 |
| 3,213,398 | 10/1965 | Marton | 336/129 |
| 3,466,743 | 9/1969 | De Puy | 310/208 |
| 3,806,782 | 4/1974 | Matsui | 310/13 |
| 3,906,622 | 9/1975 | Sakano | 310/268 |
| 4,028,572 | 6/1977 | Baltisberger | 310/201 |
| 4,128,818 | 12/1978 | Scherba | 336/129 |

FOREIGN PATENT DOCUMENTS

| | | | |
|---|---|---|---|
| 26562 | 3/1883 | Fed. Rep. of Germany | 310/201 |
| 1426280 | of 1966 | France | 310/268 |

*Primary Examiner*—R. Skudy
*Attorney, Agent, or Firm*—Fleit & Jacobson

[57] ABSTRACT

A laminated coil which may be used as a winding in electrical machinery is formed by multiple layers of thin electrically conductive material, each having an insulating layer on one side and being shaped in a specialized pattern. The patterns each form a winding and are shaped such that current flow therethrough generates a magnetic pole at only three of four cross-sectional sides. The laminated coil is formed of layers of these patterns arranged to provide a magnetic pole at all four sides.

4 Claims, 27 Drawing Figures

FIG_23

FIG_24

FIG_25

FIG_26

FIG_27

LAMINATED WINDING FOR ELECTRIC MACHINES

This is a continuation of application Ser. No. 711,556, filed Aug. 4, 1976 now abandoned.

The invention relates to laminated windings for electric machines, such as motors, generators, transformers etc. and aims to provide for such machinery windings, which can be manufactured economically and in a labour saving manner.

The windings in accordance with the invention are extremely suitable for disc motors with radial air gap with or without core in the rotor, not only for linear motors with linear gap and for cylindrical motors and generators with axial air gap, but also for transformers and measuring instruments.

The winding in accordance with the invention is characterized in, that the winding consists of a multiple of patterns of sheet or plate material, which is isolated on one side, whereby each pattern forms a wave winding going around, which, upon passage of current, encloses each magnetic pole formed at three of its four sides and that a multiple of such patterns are stacked and shifted then mutually connected, so that each magnetic pole is enclosed completely.

The winding in accordance with the invention is mechanically as well as electrically extremely strong, whereas the space factor is optimum and the cooling extremely good.

The patterns for the windings in accordance with the invention are made up preferably out of punched sheet or plate material, but can also be composed of cast plate material.

For a disc motor, where generally use is made of a stationary stator disc mounted in the centre between two rotor discs, provided with magnets of opposite polarity or for an execution of a motor, whereby the disc in the centre acts as a rotor and the magnets are stationary, the winding in accordance with the invention can be applied as well as for the rotor as for the stator.

It should be noted, that windings made out of plate material are known, per se from the Dutch patent application No. 670 6453.

These windings however are not executed in accordance with the extremely simple manner of the subject invention.

Likewise these known windings are less robust and not suitable for high outputs, so that they can only be applied in small motors.

One embodiment of the winding in accordance with the invention consists of radially arranged strips, which are alternately connected on the outer circumference and inner circumference through circumference strips and whereby two adjacent strips are are elongated in the direction towards the centre and one of the inner circumference strip is connected to the radial strip which loosely overlaps the adjacent lengthened radial strip.

The winding in accordance with the invention can also be applied for linear motors for moving of vehicles, sleds of machines and the like, which do not need a single electrical connection with a network.

A winding for such a linear motor has the characteristic, that each pattern consists of parallel flat strips, which alternately are mutually connected to two at one side located ends by strips of the same dimensions and that a multiple of these patterns are stacked again and again shifted in such a way and with the ends mutually connected electrically, resulting in obtaining a winding for a linear machine.

Also cylindrical machines can be supplied with laminated windings in accordance with the invention in a simple way and to great advantage.

The manufacture of such windings is here also extremely labour saving and simple, whilst here again the space factor is optimum.

A laminated winding for such cylindrical machines is characterised by a cylinder, which is made out of rolled conductive material in strip form, which is isolated on one side and from which cylinder alternately from one end and from the other end axial running slots are taken out, so far and in such a way that a wave winding is developed, which by passage of current can form magnetic poles, whereby each magnetic pole is enclosed on three of the four sides and whereby the winding is provided with electrical connections for the supply of the electrical current.

With conventionally wound coils more copper is generally used outside the effective grooves than inside, whereby such conventional motors become needlessly heavy and the material, which has no useful function can be considered as lost.

Instead of copper for the windings in accordance with the invention aluminum can also be used.

It is pointed out that direct current machines should be provided with an invertor type commutator, which converts the direct current supplied into a one, two or three phase alternating current, depending on the type of winding employed.

This can be explained by the fact that with laminated windings having the so called three quarter winding, all coils of a winding are automatically connected in series with each other and only the ends of a winding can be connected to the commutator-invertor.

Windings in accordance with the subject invention can for example be applied in motors, earmarked for mounting in the rim of a bicycle, whereby the motor has to supply a couple of 5 kg/m to take an inclination of 10 percent with a speed of 10 km/hr.

The total number of magnets amounts to 32, 16 pieces on each rotor disc.

In this case for a two-phase winding 32 coils on each side of the stator disc are required, making a total of 64 coils.

Making these coils by winding 2 mm$^2$ wire and connecting mutually would be hardly feasible on account of their small dimensions and also as each coil should contain 25 windings.

In any case labour costs involved in making the windings and connections for such coils in conventional motors would make production costs of the motor prohibitive.

The invention will now be further explained with reference to the drawings, showing execution examples.

This motor has eight magnets on each side of the stator, having on each side of the disc sixteen coil cores.

Figure 1:
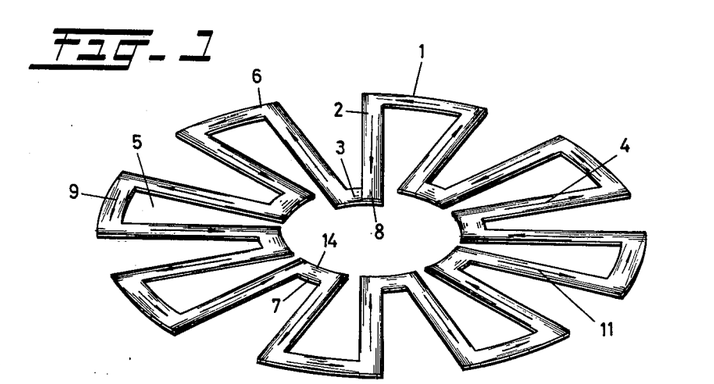
FIG. 1 is a view of a punched pattern of a laminated disc winding for a three quarter winding.

The pattern 1, FIG. 1 is punched preferably out of aluminium on account of the weight and price and forms part of the stator winding with three quarter winding of the motor with linear air gap, which later on in the description will be explained. The punched pattern 1 is not symmetrically punched out.

The connection 3 is somewhat longer than other similar connections 7. In fact, connection 3 is a strip width 2 longer than the others. This has been done, so that when pattern 1, FIG. 1 is laid on pattern 13, FIG. 2, the lip 3 will be situated on the underlaying lip 8 and in this way makes contact.

Before or after punching the pattern is provided on one side with an isolating layer.

Assuming that the lips 3 and 8 of FIG. 1 do not have contact with each other and a voltage between these lips 3 and 8 is brought, then, if 8 is the positive pole, a current will flow through the pattern in the direction as indicated by the arrows 4 and 11.

The current travel around opening 5 three quarters of the way, from which the name three quarter winding has been derived.

It should be noted that the ends of lips 8 are not isolated, while on the other hand lips 3 having an isolating layer on top, as does the balance of the patterns.

Figure 2:
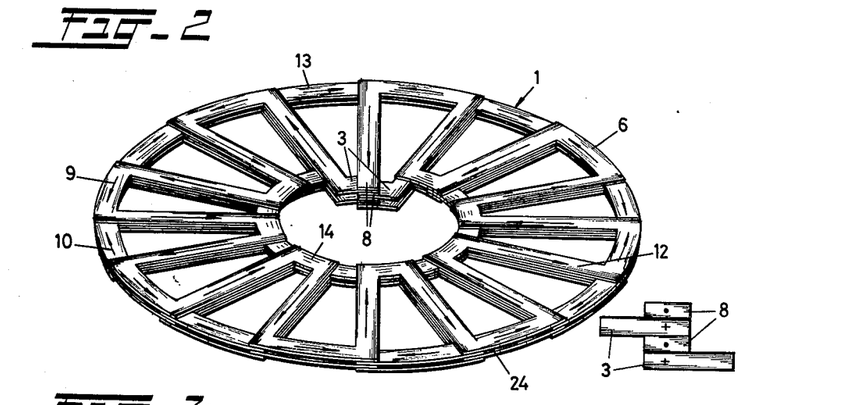
FIG. 2 is a view of a complete winding made up out of multiple three quarter windings in accordance with FIG. 1.

For a winding as shown in FIG. 2 half of the total required quantity of patterns is punched out with the isolating layer up and the other half of the total required quantity of patterns with the isolating layer down.

If now all patterns are stacked with the isolating layer up, one half of the total quantity of patterns will be a reflected image of the other half.

When a package formed of stacked patterns 6 is alternately composed of a positive pattern 1 and a negative pattern 13, and lip 3 is placed under lip 8 of the same pattern, the current will be transferred to the underlaying pattern, in other words lip 3, which is not isolated presses on lip 8 of pattern 13, if patterns 1 and 13 are laid on top of each other.

Assuming that a voltage is applied with the positive pole at the upper side of lip 8 of pattern 1 and the negative pole at the bottom side of lip 3 of pattern 13, then a current will flow in pattern 1 which is directed clockwise and in pattern 13 which will be directed anti-clockwise.

Both currents together form a full circuit around opening 5. The currents indicated by the arrows 11 and 12 flow in all underlaying layers in the same direction.

The total amperage per N Layers is $N \times I$, where I is in amperes, for each effective coilside. For two patterns, a current of $1 \times I$ flows through the ineffective sides on the inner and outer sides 14 and 15, respectively, and for N patterns, the current is $\frac{1}{2} N \times I$. the ineffective sides on the inner and outer The currents on the sides 4 and 15 are alternately oppositely directed from 9 and 10.

For clarification at the right side of FIG. 2 an enlargement has been drawn of the connections between lips 8 and 3 of consecutive patterns. It will be clear and being a characteristic of the invention, that the space factor of the conducting material, other than the thin isolating layer on the top of the patterns, is hundred percent and cannot be improved upon.

Another characteristic of the invention is that an ideal cooling is achieved by the air gap 24, located on both sides of each conductor on the inner and outer circle.

The lips 3 and 8 of the package laminated windings with three quarter winding can be pressed firmly together to obtain a good mutual contact, by making a hole through all the lips and clamping them together with a bolt and nut made out of plastic.

It is recommended to punch the top and bottom pattern of the package out of copper, as to these sides the wire connection of the connection clamps has to be soldered.

It is further recommended after making these connections to cover these with a thick layer of epoxy-resin to prevent corrosion.

Figure 3:
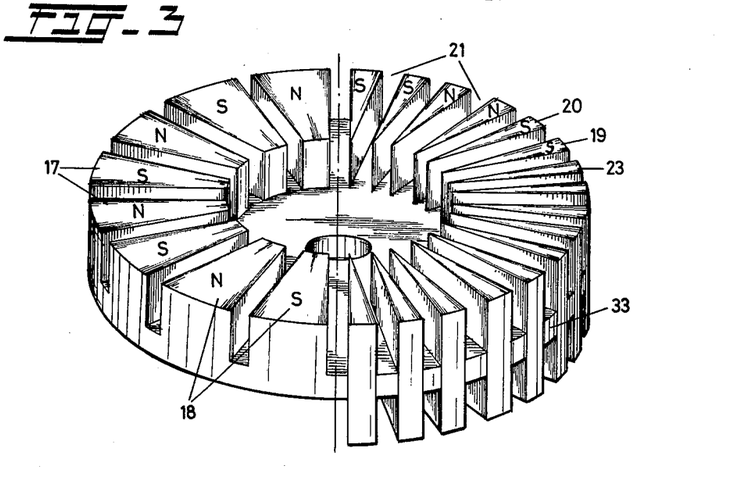
FIG. 3 is a view showing at the left side eight electromagnets over which the patterns of FIG. 2 can be placed, whilst at the right cores are shown, over which the coils can also be placed.

When the stacked patterns 6 are placed over the cores 17, as shown in FIG. 3 leftside, and a passage of current 9 and 10, refer FIG. 2, takes place, the magnet poles 18 are formed, replacing the permanent magnets for a disc motor, whereby through changing of the field intensity the couple and speed can be regulated. When the stacked patterns 6 over the cores 19 and 20 of FIG. 3 are laid, always two cores 19 and 20 are enclosed and by passage of current will have the same polarity. The cores 19 and 20 will be in this case south poles if the package of stacked patterns 6 is not turned.

To obtain a two phase winding in relation to the magnets 18 of the rotor or stator of the disc motor, the grooves 21 are now filled with the same package of stacked patterns 6. The winding is than electrically shifted 90°.

In the same way a three phase winding can be made, as long as is taken into account that the pitch between the three sides is equal to one-third of the pitch between two successive magnets. The magnet should than have a surface of three cores 19, 20 and 23 and the opening 5 in the pattern 1 should enclose three cores to enable usage of the same pattern for the magnets and cores. It is recommended to glue the effective coil sides of the patterns together with a suitable type of glue during stacking to obtain a firm package.

If the package of laminated windings with three quarter winding is constructed as shown in FIG. 2, whereby the patterns 1 and 13 are reflected images of each other and alternately are stacked, a strong disc will be obtained, which does not need support and is therefore extremely suitable as a rotor disc for a rotor with a low rotor-inertia.

If the windings of pattern 1 are supported by a disc 33 in FIG. 3 and are provided with the cores 17 and 23, reflected images 13 of pattern 1 are not required and in this case patterns 1 can be ordinarily stacked.

However also in this case lip 3 must be placed under lip 8 of each pattern, resulting in connection in series.

The principle of the three quarter winding is still maintained as each coil formed encloses three sides of a core only.

Figure 4:
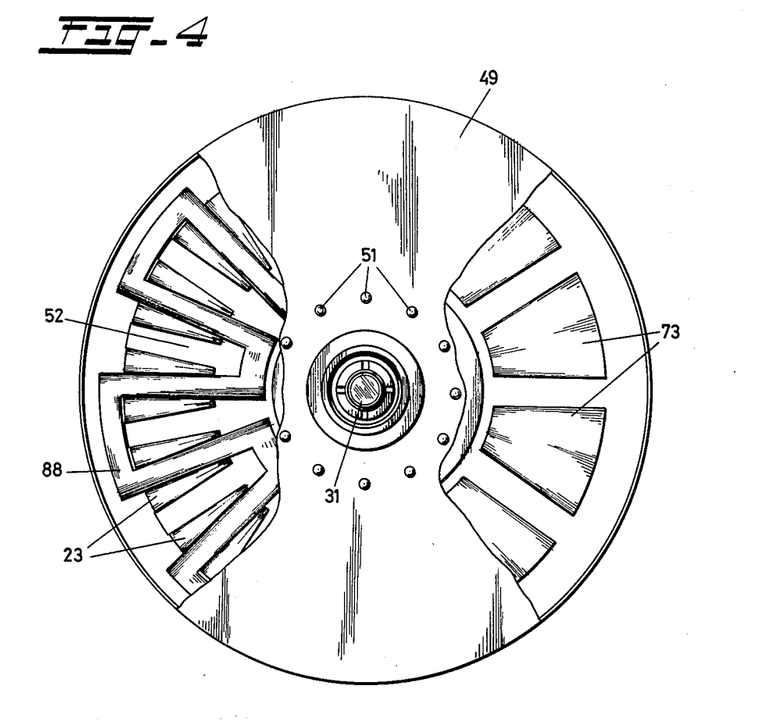
FIG. 4 is a fragmentary front elevation of a disc motor provided with a winding in accordance with the invention.
Figure 5:
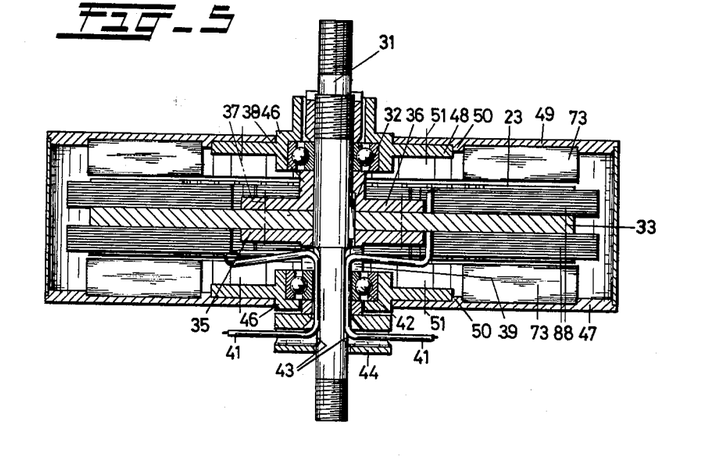
FIG. 5 is a view of the motor in accordance with FIG. 4 in cross section.

A description of the construction of the disc motor, in which a laminated winding with three quarter windings is applied is given with reference to drawings FIGS. 4 and 5.

The motor shown in FIGS. 4 and 5 encloses a shaft 31, which near its centre is provided with a loose key 32. This key 32 is located in a corresponding keyhole, which is made in the centre of a round stator disc 33.

This stator disc is near the outer circumference provided with 32 wedge type ferrite cores 23, glued to the outer circumference in corresponding wedge type recesses of the disc 33.

The ferrite cores 23 protude equally on both sides of the stator disc 33. The stator disc 33 is preferably made of a strong plastic. The part of the stator disc 33 surrounding the shaft 31 is clamped in between two discs 35 and 36 with the aid of rivets, of which only the centre lines are shown.

The hubs 38 and 39 form an integral part of disc 35 and 36. The free end of hub 39 is provided with 2 holes 40 for passage of the wiring 41, which passes via a recess 43 of the shaft 31, beneath the ball bearing 42 and through the holes in the thread protector 44 to the outside.

The ball bearing 42 is pressed into the bearing housing 45. Bearing housings 45 and 48 are provided with a shoulder 46, which fits in corresponding holes in the outer discs 47 and 49. The outer discs 47 and 49 are provided with shoulders 50 to keep the bearing housings 45 and 48 in place.

Sixteen magnets 73 are glued with a glue of good quality on the steel outer discs 47 and 49 at equal distance and with consecutive opposite polarity.

The bearing housings 45 and 48 are connected to the outer discs 47 and 49 through rivets 51.

The laminated windings with three quarter windings of which only one 1-phase winding 88 in FIG. 4 is shown, are laid around the cores 23 on both sides of the disc 33 are glued to the disc with a good quality glue.

The second phase winding (not shown) is laid in between the cores 23 developed groove 52.

The motor will be controlled electronically, whereby the frequency, the revolutions and the amperage control the couple. The description of this regulation does not fall within the scope of this invention.

Figure 6:
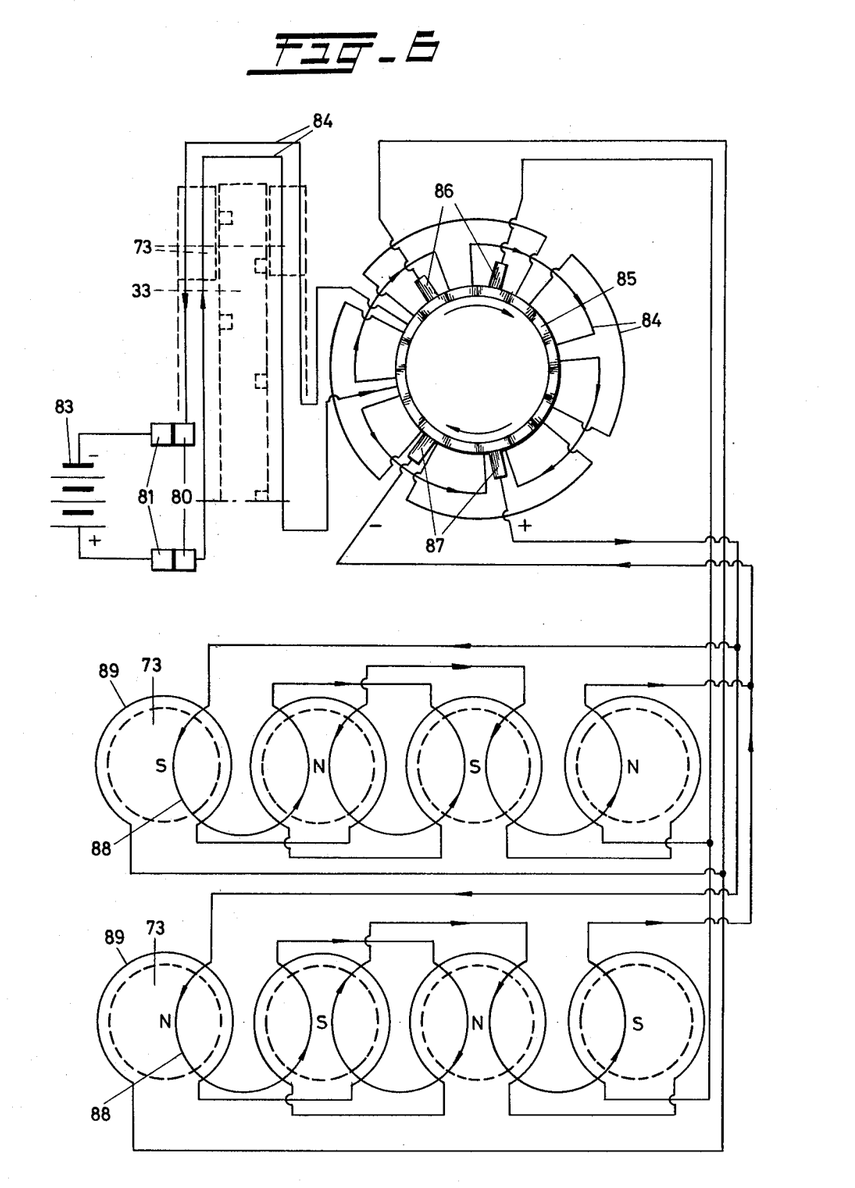
FIG. 6 shows a commutator-invertor for a two phase self starting direct current motor with radial air gap.

A schematic view of a mechanical commutator-invertor is given for the sake of clarity in FIG. 6.

The brushes 81 are connected with the direct current source 83 and rest against the rotating collectors 80.

Two wires 84, which rotate with the magnets 73 are connected with the commutator-invertor 85, which is mounted on the rotor with magnets 73 and consequently also rotates.

The brushes 86 and 87 are mounted on the shaft and are consequently stationary. When the brushes 86 are in the centre of the currentless segments than the windings 89 of the series of coils, to which the brushes 86 are connected enclose the magnets 73 and a current passage will not take place.

The brushes 87 are at that moment located in the centre of the current carrying segments, which are connected with the series of coils, of which the coil sides 88 are laying in the centre of the magnets 73.

In both series of coils an alternating current is developed with a phase shift of 90° electrically in relation to each other. The motor is self starting and free of interference as the current through the commutator-invertor will not be interrupted for a single moment but flows from one series of coils into the other.

The application of the laminated winding with three quarter windings for machines with a linear air gap will now be discussed with reference to the drawings.

Figure 7:
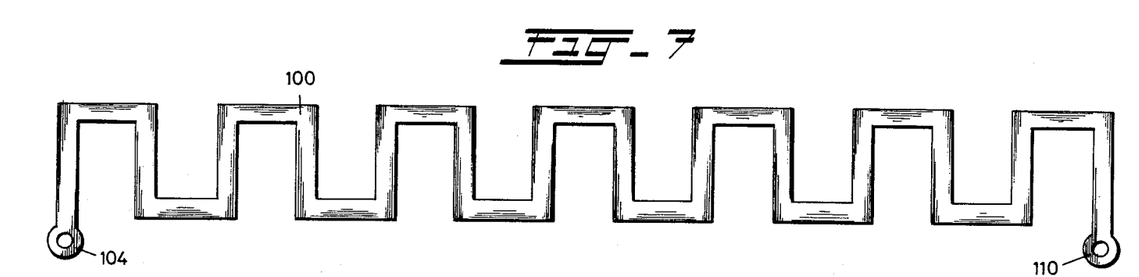
FIG. 7 is a top view of a pattern for a winding in accordance with the invention for a linear motor.

FIG. 7 gives a view of a pattern 100 for a laminated winding with three quarter winding for a linear motor. The pattern is punched out of plate material or cast directly in the shape required.

Figure 8:
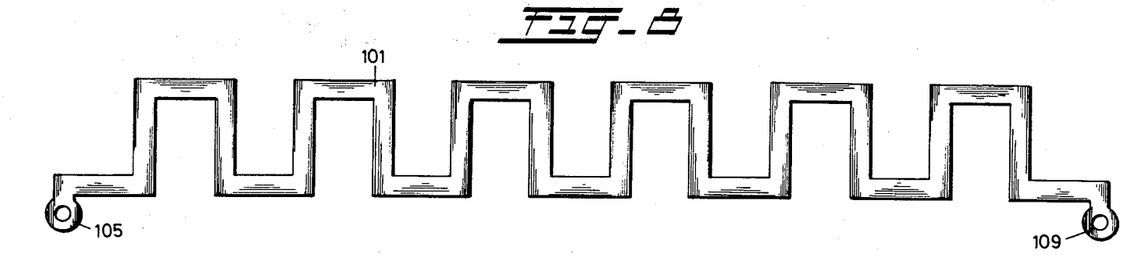
FIG. 8 is a top view of a similar pattern for a winding as in FIG. 7.
Figure 9:
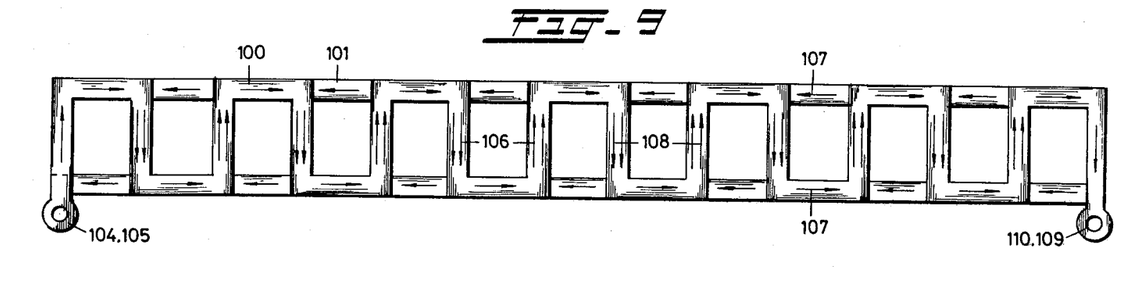
FIG. 9 is a top view of a complete winding in accordance with the invention for a linear motor, consisting of multiple patterns in accordance with FIGS. 7 and 8.

The material to be used is preferably aluminium or copper, provided on top with an isolating layer. The ends of the pattern 100 are provided with eyes 104 and 110. FIG. 8 is a view of the pattern 101, which is a reflected image of pattern 100 and also is provided with eyes 105 and 109. FIG. 9 is a view in which pattern 100 is laid on top of pattern 101.

The eyes 104 and 109 are not isolated, the eyes 105 and 110 are on top isolated just as the balance of the patterns 100 and 101. The eyes 109 and 110 are pressed together. If a current is applied between the top side of eye 104 and the bottom side of eye 105, with the positive at eye 104, than a current will flow as indicated by the arrows 106, 107 and 108 and a full circuit is formed.

While two currents 106 and 108 flow through each of the effective sides, only one single current 107 again and again oppositely directed, will flow at the outsides.

Figure 10:
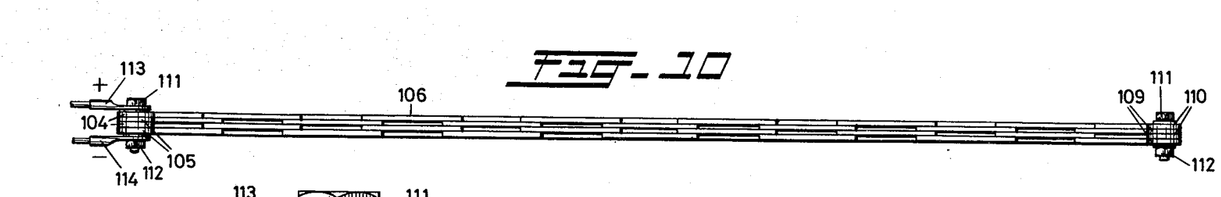
FIG. 10 is a side elevation of a winding for a linear motor in accordance with FIG. 9.

FIG. 10 is a side view, whereby four patterns 100 and 101 are alternately stacked and of which the eyes 104 and 105 on one end and the eyes 109 and 110 at the other end by means of bolts made of plastic 111 and nuts 112 are clamped together. The cable eyes 113 and 114 are clamped under the head of bolt 111 and nut 112.

By applying a voltage to the cables of 113 and 114 a four fold current will flow through the effective conductors 106.

Figure 11:
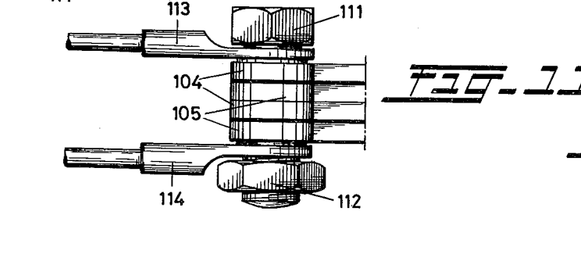
FIGS. 11 and 12 are views of connection means for the ends of the winding in accordance with FIG. 10.
Figure 12:
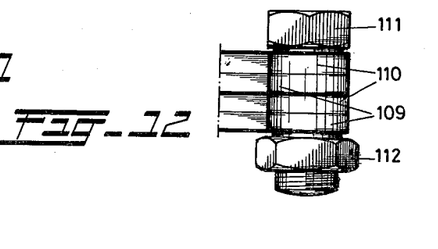

FIGS. 11 and 12 are enlarged views of the eye connections 104 and 105 at one end and the eye connections 109 and 110 at the other end. Also here emerges the extreme advantage of the invention that the effective space factor is optimum, whilst cooling slots are located between the stacked patterns.

Figure 13:
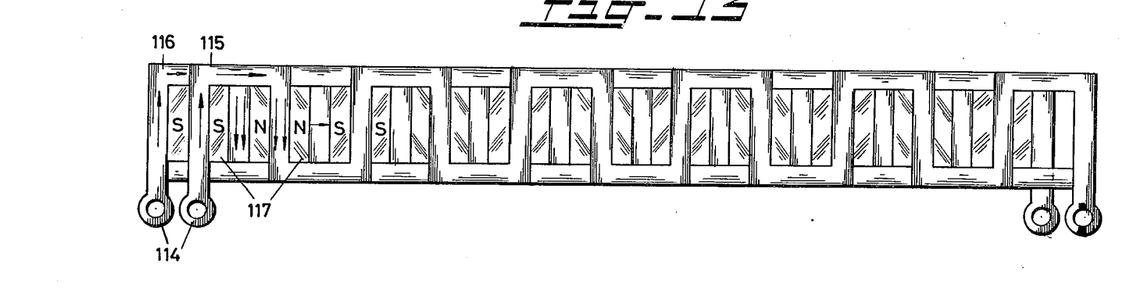
FIG. 13 is a view of a double phase linear winding for a linear motor.

FIG. 13 shows a two-phase linear winding, composed of two packages patterns 115 and 116. The two coil sides are laying 90° electrically shifted in relation to each other.

When the coil sides of phase winding 116 enclose the magnets 117 laying at the back, than the coil sides of phase winding 115 are located in the centre of magnets 117.

In the same way a three phase laminated winding with three quarter winding can be obtained, as described for a three-phase winding of a disc motor.

If the linear motor is used for the propulsion of for example vehicles, a frequency determined in advance will have to be used, which can be regulated from the exchange.

The winding in accordance with the invention will now be discussed as applied in electrical cylindrical motors and generators with axial air gap.

In this way very small machines and machines of high output can be constructed, which in comparison will weigh less and can be executed with compact dimensions.

The winding in accordance with the invention is also of great advantage for motors, requiring a quick reaction, thus should possess a low rotor inertia.

Production of these type of motors is very simple. It is noted that for machines with an axial air gap it will not be necessary that a full winding for the electric current is required and that with a three quarter winding the same result can be achieved, as only the effective coil sides are of importance.

As already described in previous applications of the $\frac{3}{4}$ circuit laminated windings, the starting phase here is also a long strip of plate material with conductiong characteristics, such as aluminium or copper with an isolating layer as paper or similar material.

The strip has a thickness of 0.2 mm with a width of 100 mm, resulting in a section of 2 mm$^2$. The space factor of the winding is nearly 100 percent and cannot be improved upon.

The so called iron-copper relation is extremely good and the machine can be constructed with compact dimensions with a considerable saving in aluminium or copper.

Figures 14, 15, 16, 17, 18, 19:
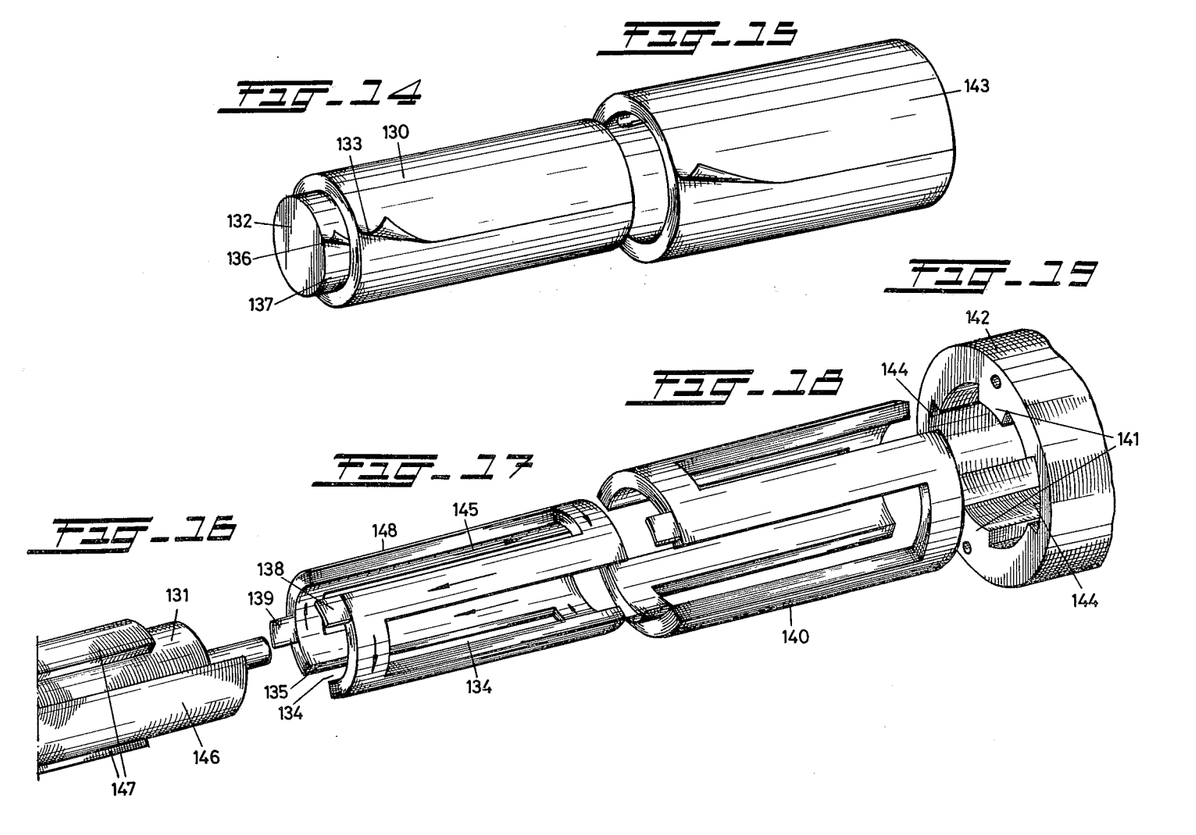
FIG. 14 shows the starting phase in the manufacture of a cylindrical rotor winding.
FIG. 15 shows the starting phase in the manufacture of a cylindrical stator winding, which can be applied with the rotor winding in accordance with FIG. 14.
FIG. 16 shows a rotor for a rotor winding in accordance with FIG. 14, which rotor is provided with two fixed pole shoes and two removable pole shoes.
FIG. 17 shows the final rotor winding which can be slided over the rotor in accordance with FIG. 16.
FIG. 18 shows the final stator winding which can be slided in the stator package in accordance with FIG. 19.
FIG. 19 shows the stator package for a cylindrical motor.

With reference to FIGS. 14 up to 19 inclusive, a production method for the manufacture of such a machine with a winding in accordance with the invention will now be described.

It should be noted that a nearly unlimited number of rotor or stator poles can be achieved.

The rotor discussed with reference to FIGS. 16 and 17 is a four-pole rotor and the stator is also executed as a four-pole stator.

However, in the same way a two, six, eight, ten, twelve, etc. pole rotor or stator can be made.

FIG. 14 shows a shaft 132 of about the same diameter as the core of rotor 131. On this shaft 132 is laid a layer of copper or aluminium 136.

This winding 136 is laid with the isolated side on the shaft 132.

Subsequently a strip of aluminium or copper, of which the thickness and width and length has been previously calculated and provided with an isolated layer on one side, is rolled with the isolated side up on the first layer 136 and the shaft 132.

The width of strip 130 is less than the first laid winding 136. During rolling a suitable glue is applied between the layers.

It is also possible to omit the first winding 136, but to slide the contact lips 138 and 139 afterwards in between.

At this stage the roll 130 obtained is now pulled from the shaft 132. Assuming that the contacts 139 at the inner side of the roll 130 and on the outside 138 are connected to a current source, than a current will flow in the roll in the direction of the layers laid, in other words, making its way spirally through the roll. Such a current has no useful purpose.

For this reason four slots 134 are sawn as illustrated in FIG. 17. The result will be that the current will now not only flow in a spiral direction but also in a zig-zag direction over the width of the roll as indicated by the arrows 145.

These zig-zag currents are useful and can be considered as the current in standard wire windings of conventional coils.

The provision of slots can be executed in different ways. The possibility exists that a short circuit is created between the layers by milling or cutting the slots.

In this case the interior sides of the slots 135 should be polished.

FIG. 14 is a view of the roll 130, which in FIG. 17 is provided with slots 134.

FIG. 16 is the rotor provided with two fixed poleshoes 147, over which the laminated winding with three quarter windings 148 can be placed.

The loose poleshoes 146 are pressed in after the winding 148 is put in place.

The winding 148 lays then closed in between the poleshoes 146 and 147.

The same production method is followed for stator 142, made out of roll 143 and after completion looks as the laminated winding with three quarter winding 140. The stator is also provided with two fixed poleshoes 141 and two slots 144 in which the loose poleshoes (not illustrated) are pressed.

Here also the winding 140 is firmly closed in by the poleshoes 141 and the loose poleshoes (not illustrated).

It will be clear that multiple phase windings can be achieved by sliding several manufactured cylinders into each other, whereby the effective coil sides are shifted 90° or 33$\frac{1}{3}$° electrically in relation to each other.

Figure 20:
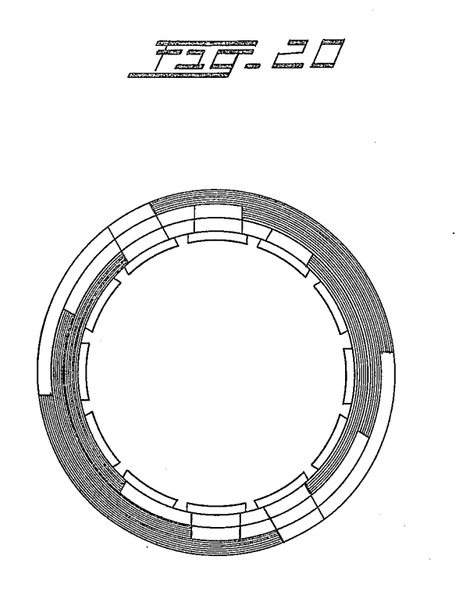
FIG. 20 shows the top end of a three phase stator winding with three quarter winding.

FIG. 20 shows a top view of a twelve-pole stator with a three-phase winding.

The laminated winding with three quarter windings in accordance with the invention can also be applied for motors, of which the rotor-inertia has to be low and consequently the rotor should have a limited mass. Such a rotor will now be described with reference to FIG. 21.

Figure 21:
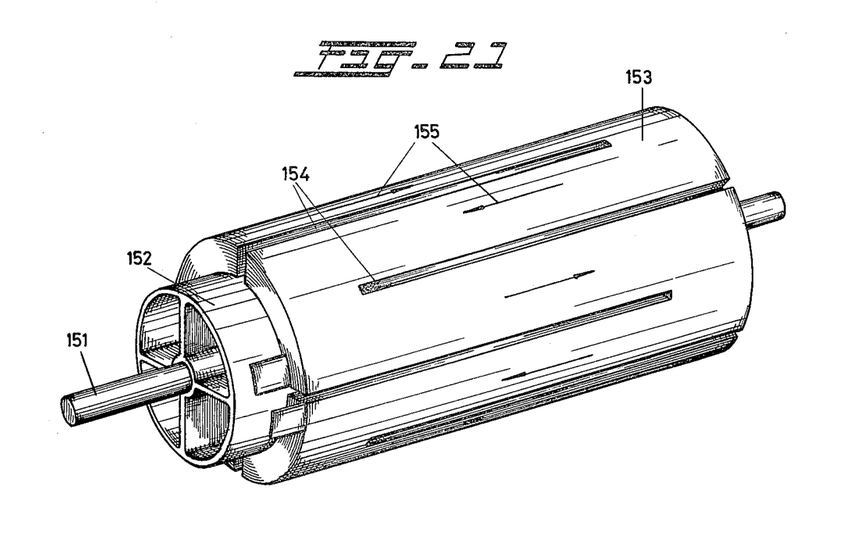
FIG. 21 is a view of a rotor winding for a motor with low rotor-inertia.

A production method in accordance with the invention will be to mount on the shaft 151 a small cylinder 152 made out of plastic and to fit on this cylinder the winding 153 in which slots 154 are made. The winding 153 is rolled in the same way as the rotor with poleshoes, FIG. 14, 130.

However, now aluminium foil, which can be very thin, is used as the conductors can be very wide in proportion.

When the cylinder 153 is rolled and the glue dried and hardened, the slots 154 are made, by which at the same time the number of coil sides are determined.

In the same way a stator without pole-shoes can be wound with the laminated winding with three quarter windings. As the coils of a winding are all in series, it will be necessary to use for direct current again a commutator-invertor, converting the direct current into an alternating current.

Figure 22:
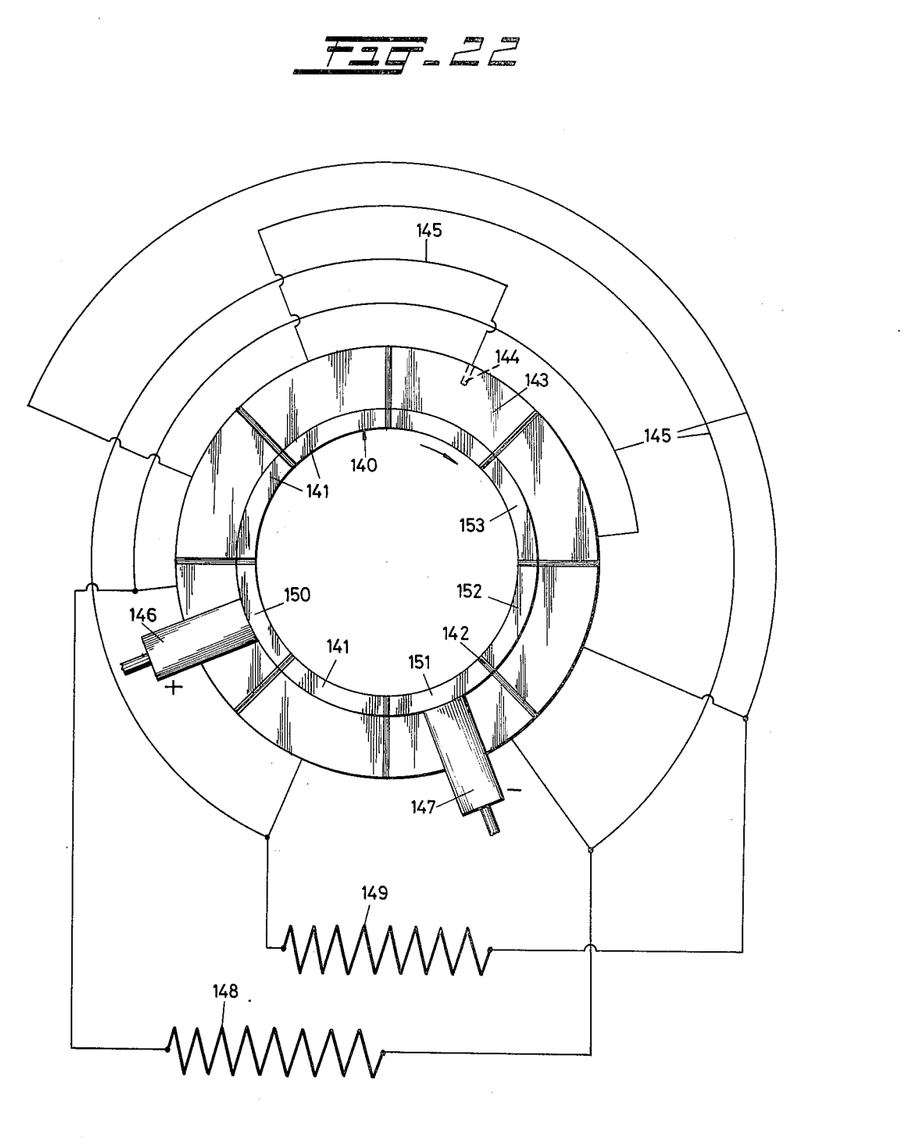
FIG. 22 is a schematic view of a commutator-invertor for a two phase direct current motor with an eight-pole rotor and a four-pole stator.

FIG. 22 gives a schematic view of a commutator-invertor for an eight-pole rotor with a two-phase winding and a four-pole stator. The rotor is self starting and interference free as the current is not interrupted for one moment, but flows from one phase winding into the other.

The commutator 140 is built up out of eight commutator segments 141, which through mica filling 142 are isolated from each other. The commutator segments are provided with a high collar 143, in which holes 144 are drilled and in which the through connections 145 of the segments to the 180° opposite laying segments are soldered.

The carbon brushes 146 and 147 are mounted 90° in relation to each other. When a positive voltage is applied to carbon brush 146 and a negative voltage to carbon brush 147, than a current will flow from left to right through phase winding 148. Phase winding 149 does not have current supplied.

The mounting of the magnets in the stator is, together with the position of the commutator executed in such a way, that the non-current carrying segments 141 of the commutator are connected with the series of coils 149, of which the cores are situated in the centre of the magnets.

The current carrying coils are situated with their cores in the centre between two magnets.

Assuming that the rotor will rotate to the right, by which the commutator-invertor also turns to the right, then carbon brush 146 will rest on both segments 150 and 141 and at the same time carbon brush 147 rests on segments 151 and 152.

A current will also now flow from left to right through the second phase winding 149, which coincides with the direction of rotation. Rotating a bit further, the cores with the phase winding 148 will come in the centre of the magnets and will not be supplied with current as the carbon brushes 146 and 147 only make contact with the segments 141 and 152, by which only the winding 149 carries current.

Rotating a bit further again the carbon brushes 146 and 147 will rest respectively on segments 141, 151 and on 152 and 153.

At this stage still a current will flow from left to right through winding 149 and a current from right to left through winding 148.

Turning again a bit further, winding 149 becomes non-current carrying, but in winding 148 a current remains flowing in the direction from right to left. Turning again a bit further the current will also now flow from right to left in winding 149 etc.

When the rotor turns in the wrong direction, than the connections of one phase winding have to be exchanged.

Figure 23:
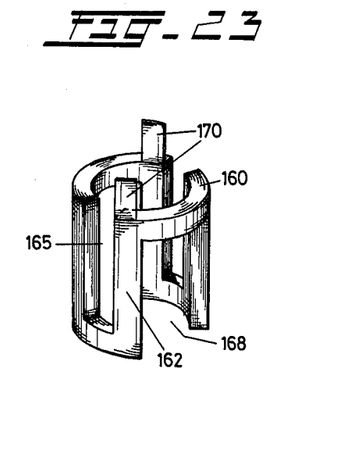
FIGS. 23 up to 27 inclusive are views of parts of a transformer, in which the cylindrical windings in accordance with subject invention can be applied.
Figure 24:
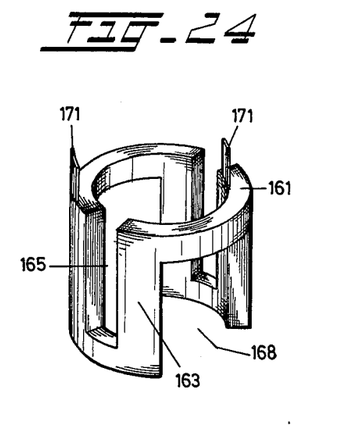

A laminated winding with three quarter windings can also be applied for induction and protective reactance coils with and without core and is extremely suitable for application in transformers which can be constructed with very compact dimensions. FIG. 23 represents the primary winding 160. This winding is pushed in the secondary winding 161, FIG. 24, in such a way that the coil sides 162 and 163 completely overlap each other.

Figure 25:
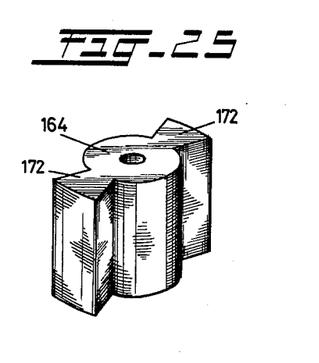
Figure 26:
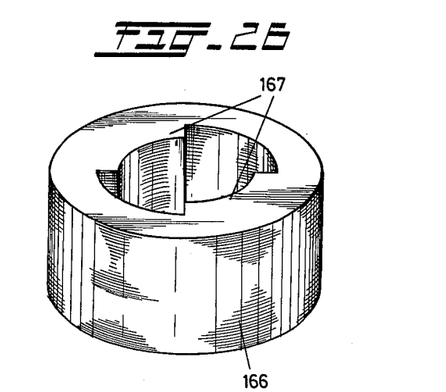
Figure 27:
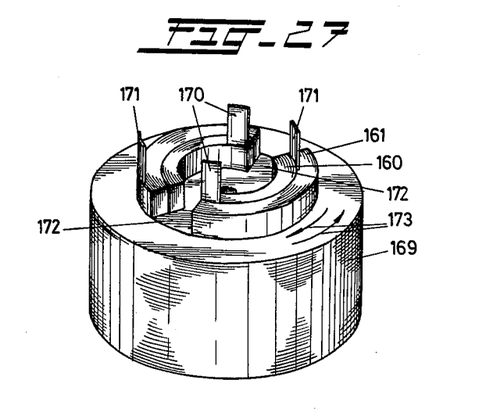

The stamping package, which forms the core 164, FIG. 25, is pushed into the slots 165, after which the whole is pressed into the stamping package of the core shell 166, the core shoes 167 slide into the slots 168 and the compact assembly 169, FIG. 27, is obtained.

The contact lips 170 are connected with the primary current source and from the contacts 171 the transformed voltage is taken. The magnetic flux goes from the core shoe 172 to the core shell shoes 167 through the core shell 166. The lines of force will be kept very short and alternately follow the direction of the arrows 173.

The magnet field is completely enclosed and the leakage factor cannot be improved upon in any other way.

Electric measuring instruments, although not shown in this description, can no doubt also be provided with laminated windings with three quarter windings, thinking of coils with radial air gap as well as coils with axial air gap. Light and strong coils can be made in this way.

Some calculations for cylindrical machines are given below:

The number of coil sides Z is equal to the number of coils S. Z=S (and not 2S as usual).

The number of coils S is equal to the number of slots or recesses U. S=Z=U.

The number of windings N per coil side is equal to the number of layers rolled N.

The total number of conductors M is equal to the number of coilsides Z multiplied by the number of layers. M=Z·N The length of the conductor on a coil is $$L = \pi(d_1+d_2)/2 \cdot N + Z \cdot N \cdot 1_G$$

Whereby $\pi(d_1+d_2)/2$ = average circumference
N = number of layers
Z = number of coil sides
$1_G$ = the length of a coilside, measured between the centre lines of the width of the conductor.

I claim:

1. A laminated winding for generating magnetic poles of a magnetic field in electric machines, characterized in that the winding is composed of a multiple of stacked, electrically connected, mutually isolated circular patterns of plate material of the same shape, each having an insulating layer on one side and forming electrical conductors, wherein each pattern forms a wave winding and is composed of a plurality of radially arranged strips which are electrically connected at their ends by outer and inner circumferential strips of electrical conductor material alternatively located on the outer circumference and on the inner circumference, respectively, so that magnetic poles are generated upon passage of current through each wave winding, and wherein a first adjacent radial strip and a second adjacent radial strip in each pattern are elongated towards the center of said pattern, said second adjacent radial strip having an inner end, said first adjacent radial strip having one of said inner circumferential strips overlapping the inner end of said second adjacent radial strip, each of said magnetic poles having four cross-section sides and being defined at three of said four cross-section sides by two of said radially arranged strips and one of said circumferential strips, and wherein said stacked patterns are stacked mutually displaced one with respect to another such that the respective outer and inner circumferential strips of adjacent said stacked patterns together define each magnetic pole, each pair of adjacent ones of said stacked patterns being the mirror image of the other said stacked patterns, said first and second adjacent radial strips of said stacked patterns being arranged one on top of another in alternating fashion so that each said first adjacent radial strip has its inner circumferential strip adjacent to said inner end of at least one of said second adjacent radial strips of said stacked patterns, successive said stacked patterns being electrically connected in series such that, upon passage of current through all said stacked patterns, a plurality of magnetic poles of successively opposite polarity is produced.

2. A winding in accordance with claim 1, wherein each pattern is a punched plate.

3. A winding in accordance with claim 1, wherein each pattern is a portion of sheet material.

4. A laminated winding in accordance with claim 3, wherein all patterns of said laminated winding are of the same shape, and wherein, of each pair of adjacent stacked patterns, one pattern is stacked on the other as the mirror image of the other, and wherein each of said second adjacent radial strips in the stack has its inner end on top of the inner circumferential strip of a corresponding one of the first adjacent radial strips in the stack, and wherein successive said patterns are electrically connected such that all patterns are connected in series and, upon passage of current through all patterns, magnetic poles of successively opposite polarity and arranged perpendicular to the plane of the laminated winding are produced.

* * * * *